(12) United States Patent
Zhu et al.

(10) Patent No.: US 11,662,275 B2
(45) Date of Patent: May 30, 2023

(54) LOADING SYSTEM AND TEST EQUIPMENT FOR AUTOMOBILE CHASSIS SIMULATION ROAD TEST

(71) Applicant: CITIC Dicastal Co., Ltd., Qinhuangdao (CN)

(72) Inventors: Zhihua Zhu, Qinhuangdao (CN); Yingying Song, Qinhuangdao (CN); Zuo Xu, Qinhuangdao (CN); Hanqi Wu, Qinhuangdao (CN)

(73) Assignee: CITIC Dicastal Co., Ltd., Qinhuangdao (CN)

( * ) Notice: Subject to any disclaimer, the term of this patent is extended or adjusted under 35 U.S.C. 154(b) by 22 days.

(21) Appl. No.: 17/368,250

(22) Filed: Jul. 6, 2021

(65) Prior Publication Data
US 2022/0316992 A1    Oct. 6, 2022

(30) Foreign Application Priority Data

Apr. 1, 2021  (CN) .......................... 202110353823.2

(51) Int. Cl.
*G01M 17/04*    (2006.01)
(52) U.S. Cl.
CPC ................................ *G01M 17/045* (2013.01)
(58) Field of Classification Search
CPC ........................... G01M 17/04; G01M 17/045
See application file for complete search history.

(56) References Cited

U.S. PATENT DOCUMENTS

| | | | | | |
|---|---|---|---|---|---|
| 4,238,954 | A | * | 12/1980 | Langer | G01M 17/022 73/146 |
| 4,344,324 | A | * | 8/1982 | Langer | G01M 17/022 73/146 |
| 4,584,873 | A | * | 4/1986 | Ongaro | G01M 17/022 73/146 |
| 4,655,080 | A | * | 4/1987 | Ongaro | G01M 1/225 73/462 |
| 4,658,656 | A | * | 4/1987 | Haeg | G01M 17/007 73/669 |

(Continued)

*Primary Examiner* — Eric S. McCall
(74) *Attorney, Agent, or Firm* — IPro, PLLC (57) ABSTRACT

The present disclosure belongs to the technical field of automobile chassis suspension system tests, and provides a loading system and test equipment for an automobile chassis simulation road test. The loading system includes an inclination angle regulation assembly, an automobile weight loading assembly, a rotation angle regulation assembly and a vertical load loading assembly, can simulate to apply various loads which a chassis bears in the real road running process of an automobile, and ensures consistency between a simulation test result and a real automobile test field detection result; and the test equipment further includes a suspension assembly, an acceleration torque assembly and a rotary drum assembly, can simultaneously test the fatigue durability of automobile chassis parts such as a wheel, a suspension and the like, is high in consistency between a test result of the test equipment and a test result of a test field, has universality, can mount wheel and suspension systems of various automobile types and test the fatigue durability of the wheel and suspension systems of various automobile types, shortens the development period of a finished automobile, and reduces the development cost.

9 Claims, 4 Drawing Sheets

(56) References Cited

U.S. PATENT DOCUMENTS

| | | | | |
|---|---|---|---|---|
| 4,981,034 | A * | 1/1991 | Haeg | G01M 17/04 73/115.07 |
| 5,241,856 | A * | 9/1993 | Petersen | G01M 17/04 73/115.07 |
| 5,610,330 | A * | 3/1997 | Fricke | G01M 17/0074 73/146 |
| 6,112,586 | A * | 9/2000 | Fricke | G01M 17/007 73/146 |
| 7,421,890 | B2 * | 9/2008 | Imanishi | G01M 17/022 701/72 |
| 2006/0218999 | A1 * | 10/2006 | Friske | G01M 17/022 73/146 |
| 2007/0261469 | A1 * | 11/2007 | Friske | G01M 17/022 73/146 |
| 2010/0037686 | A1 * | 2/2010 | Kitagawa | G01M 17/022 73/146 |
| 2012/0167674 | A1 * | 7/2012 | Sumitani | G01M 17/021 73/146 |
| 2013/0068006 | A1 * | 3/2013 | Cutting | G01M 17/02 73/146 |
| 2013/0160537 | A1 * | 6/2013 | Preising | G01M 17/04 73/116.01 |
| 2020/0056963 | A1 * | 2/2020 | Cutting | G01M 17/021 |
| 2020/0070878 | A1 * | 3/2020 | Du | B62D 7/18 |
| 2020/0292418 | A1 * | 9/2020 | Okada | G01M 17/0074 |
| 2022/0148553 | A1 * | 5/2022 | Li | G10K 11/172 |
| 2022/0152450 | A1 * | 5/2022 | Irving | A63B 23/0476 |
| 2022/0187168 | A1 * | 6/2022 | Dan | G01M 17/04 |

* cited by examiner

LOADING SYSTEM AND TEST EQUIPMENT FOR AUTOMOBILE CHASSIS SIMULATION ROAD TEST

TECHNICAL FIELD

The present application relates to the technical field of automobile chassis suspension system tests, in particular to a loading system and test equipment for an automobile chassis simulation road test.

BACKGROUND

A fatigue durability road test of an overall automobile chassis belongs to the final link of automobile development, generally is carried out in a professional test field and needs to use a finished automobile, work fatigue strength of automobile test personnel is high, the period is very long, the test cost is high, and once parts have failures, high development cost and serious progress losses will be caused, and thus, before a finished automobile road test is carried out, reliability verification of an automobile chassis part level and a system level needs to be carried out in a test room.

In order to verify the fatigue durability of a wheel, generally, tests of radial fatigue, bending fatigue and biaxial fatigue of a simulation road test are adopted to carry out verification in the test room, but in those bench tests, only the wheel is mounted, there is no consideration of the buffering effect of a suspension on a load which the wheel bears, and there may be a certain deviation between test results and a real automobile result. In order to verify the fatigue durability of an automobile chassis system, an axis coupling road simulation test of a quarter suspension system, a half vehicle or a whole chassis can be carried out in the test room, but in the test, the wheel is not mounted, loading is carried out at a shaft head, wheel performance cannot be investigated, the test has high requirements for iteration evaluation, patch measurement, data analysis and the like, and the test cost is also high.

SUMMARY

Embodiments of the present application provide a loading system and test equipment for an automobile chassis simulation road test, which can solve problems in the background art. Application of various loads which a chassis bears in the real road running process of an automobile can be simulated, the fatigue durability of automobile chassis parts such as a wheel, a suspension and the like can be simultaneously tested, consistency between a test result of the loading system and the test equipment and a test result of a test field is high, the loading system and the test equipment have universality, wheel and suspension systems of various automobile types can be mounted, the fatigue durability of the wheel and suspension systems of various automobile types can be tested, the development period of a finished automobile is shortened, and the development cost is reduced.

In order to achieve the objective, the present disclosure provides the following technical solution:

In a first aspect, provided is a loading system for an automobile chassis simulation road test, wherein the loading system includes a mounting base, an inclination angle regulation assembly, an automobile weight loading assembly, a rotation angle regulation assembly, a vertical load loading assembly and an adapter plate; the inclination angle regulation assembly is mounted on the mounting base, the automobile weight loading assembly is arranged on the inclination angle regulation assembly, the rotation angle regulation assembly is arranged on the automobile weight loading assembly, and the vertical load loading assembly is arranged on the rotation angle regulation assembly; and the adapter plate is used for mounting a suspension assembly and a wheel, the adapter plate is vertically fixed downwards on the rotation angle regulation assembly, and the vertical load loading assembly acts on an upper end of the adapter plate.

In some embodiments, the inclination angle regulation assembly includes an inclination angle L arm fixing main body, an inclination angle rotation shaft and an inclination angle regulation electronic control unit, and the inclination angle L arm fixing main body is movably connected to the mounting base and can rotate around the inclination angle rotation shaft; one end of the inclination angle regulation electronic control unit is movably connected to the mounting base, while the other end is movably connected with the inclination angle L arm fixing main body, and the inclination angle regulation electronic control unit can drive the inclination angle L arm fixing main body to rotate around the inclination angle rotation shaft; the automobile weight loading assembly includes an inclination angle L arm and an inclination angle L arm vertical regulation electronic control unit, a vertical downward first guide rail is formed on a lateral surface of the inclination angle L arm fixing main body, the inclination angle L arm is arranged on the first guide rail, the inclination angle L arm vertical regulation electronic control unit is arranged on the inclination angle L arm fixing main body, and the inclination angle L arm vertical regulation electronic control unit can drive the inclination angle L arm to move up and down along the first guide rail; the rotation angle regulation assembly includes a rotation angle L arm, a first bearing and a rotation angle regulation electronic control unit, a horizontal portion of the rotation angle L arm is fixedly connected with an inner ring of the first bearing, a horizontal portion of the inclination angle L arm is connected with an outer ring of the first bearing, and the rotation angle regulation electronic control unit is arranged between the rotation angle L arm and the inclination angle L arm, and can drive the rotation angle L arm to rotate around a rotation shaft of the rotation angle regulation electronic control unit; the vertical load loading assembly includes a vertical load hydraulic actuator, and the vertical load hydraulic actuator is fixed on the rotation angle L arm, positioned over the adapter plate and connected with the adapter plate; and the adapter plate is vertically fixed downwards inside a vertical portion of the rotation angle L arm.

In some embodiments, the inclination angle regulation electronic control unit is any one of an electric cylinder, an air cylinder and a hydraulic cylinder.

In some embodiments, the inclination angle L arm vertical regulation electronic control unit includes a first motor, a first speed reducer, a belt, a first screw rod and a first sliding block, an output end of the first motor is connected with the first screw rod through the first speed reducer and the belt, and the first motor can drive the first screw rod to rotate; and the first sliding block is fixedly connected with the inclination angle L arm, and the first screw rod is matched with the first sliding block.

In some embodiments, the rotation angle regulation electronic control unit includes a rotation angle motor and a second speed reducer, a shell of the rotation angle motor is fixed on the rotation angle L arm, and an output shaft of the rotation angle motor is fixed on the inclination angle L arm through the second speed reducer.

In some embodiments, a six-component sensor unit is arranged between the adapter plate and an inside of the vertical portion of the rotation angle L arm, the six-component sensor unit includes a bottom plate, a six-component sensor and a cover plate, and the six-component sensor is arranged between the bottom plate and the cover plate; the cover plate is provided with a second guide rail, the adapter plate is arranged on the second guide rail, and the adapter plate can move up and down along the second guide rail.

In a second aspect, another embodiment of the present application provides test equipment for an automobile chassis simulation road test, including the loading system for the automobile chassis simulation road test according to any one of the embodiments above, and further including a suspension assembly, an acceleration torque assembly and a rotary drum assembly. The suspension assembly includes a suspension fixing frame and a quarter suspension for mounting a wheel, the quarter suspension is fixed on the suspension fixing frame, and the suspension fixing frame is fixed on the adapter plate; an output end of the acceleration torque assembly is connected with a transmission shaft of the quarter suspension, and the acceleration torque assembly is used for driving the wheel to accelerate rotation; and the suspension assembly can be loaded onto the rotary drum assembly through the wheel.

In some embodiments, the acceleration torque assembly includes a torque shaft driving motor, a speed reducer and a torque shaft, an output shaft of the torque shaft driving motor is connected with the torque shaft through the speed reducer, and the torque shaft is connected with the transmission shaft of the quarter suspension.

In some embodiments, the rotary drum assembly includes a rotary drum, a rotary drum speed reducer and a rotary drum motor, an output shaft of the rotary drum motor is connected with a central shaft of the rotary drum through the rotary drum speed reducer, and the rotary drum motor can drive the rotary drum to rotate.

Compared to the prior art, the present disclosure has the beneficial effects:

The present disclosure provides the loading system and the test equipment for the automobile chassis simulation road test. The loading system includes the inclination angle regulation assembly, the automobile weight loading assembly, the rotation angle regulation assembly and the vertical load loading assembly, can simulate to apply various loads which the chassis bears in the real road running process of the automobile, and ensures consistency between a simulation test result and a real automobile test field detection result; and the test equipment further includes the suspension assembly, the acceleration torque assembly and the rotary drum assembly, can simultaneously test the fatigue durability of the automobile chassis parts such as the wheel, the suspension and the like, is high in consistency between the test result of the test equipment and the test result of a test field, has universality, can mount the wheel and suspension systems of various automobile types and test the fatigue durability of the wheel and suspension systems of various automobile types, shortens the development period of the finished automobile, and reduces the development cost.

1—loading system; 2—acceleration torque assembly; 3—suspension assembly; 4—rotary drum assembly; 5—wheel; 101—inclination angle regulation electronic control unit; 102—inclination angle rotation shaft; 103—inclination angle L arm fixing main body; 104—inclination angle L arm; 105—inclination angle L arm vertical regulation electronic control unit; 106—rotation angle L arm; 107—rotation angle regulation electronic control unit; 108—adapter plate; 109—six-component sensor unit; 110—vertical load hydraulic actuator; 111—mounting base; 112—first guide rail; 113—first motor; 114—first speed reducer; 115—belt; 116—first screw rod; 117—first sliding block; 18—first bearing; 119—rotation angle motor; 120—second speed reducer; 121—second guide rail; 201—torque shaft driving motor; 202—speed reducer; 203—torque shaft; 302—brake disc; 303—brake disc cover plate; 304—brake caliper; 305—hub bearing; 306—transmission shaft; 307—steering knuckle; 308—damper and spring; 309—upper front control arm; 310—upper rear control arm; 311—lower front control arm; 312—lower rear control arm; 313—toe-shaped control arm; 314—suspension fixing frame; 401—rotary drum; 402—rotary drum speed reducer; and 403—rotary drum motor.

DETAILED DESCRIPTION OF THE EMBODIMENTS

Embodiment 1

Figure 1:
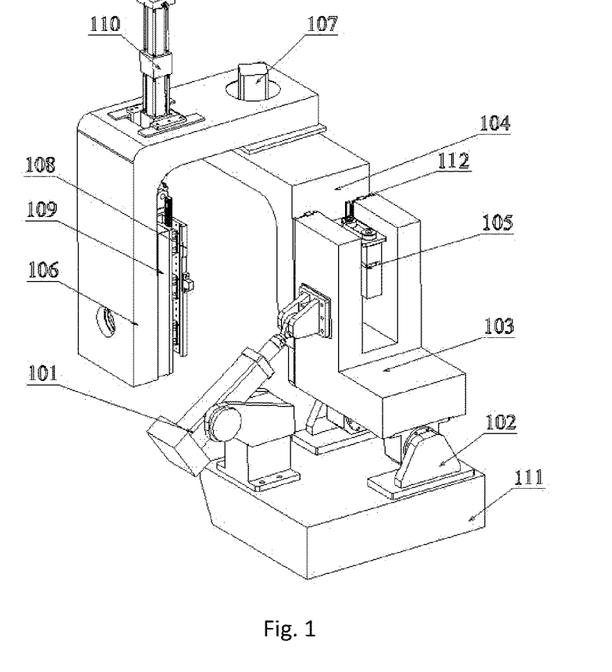
FIG. 1 is a structural schematic diagram of a loading system for an automobile chassis simulation road test according to the present application.

Embodiment 1 of the present disclosure provides a loading system for an automobile chassis simulation road test. As shown in FIG. 1, the loading system includes a mounting base 111, an inclination angle regulation assembly, an automobile weight loading assembly, a rotation angle regulation assembly, a vertical load loading assembly and an adapter plate 108. The inclination angle regulation assembly is mounted on the mounting base 111, the automobile weight loading assembly is arranged on the inclination angle regulation assembly, the rotation angle regulation assembly is arranged on the automobile weight loading assembly, and the vertical load loading assembly is arranged on the rotation angle regulation assembly. The adapter plate 108 is used for mounting a suspension assembly 3 and a wheel 5, the adapter plate 108 is vertically fixed downwards on the rotation angle regulation assembly, and the vertical load loading assembly acts on an upper end of the adapter plate 108.

Figure 2:
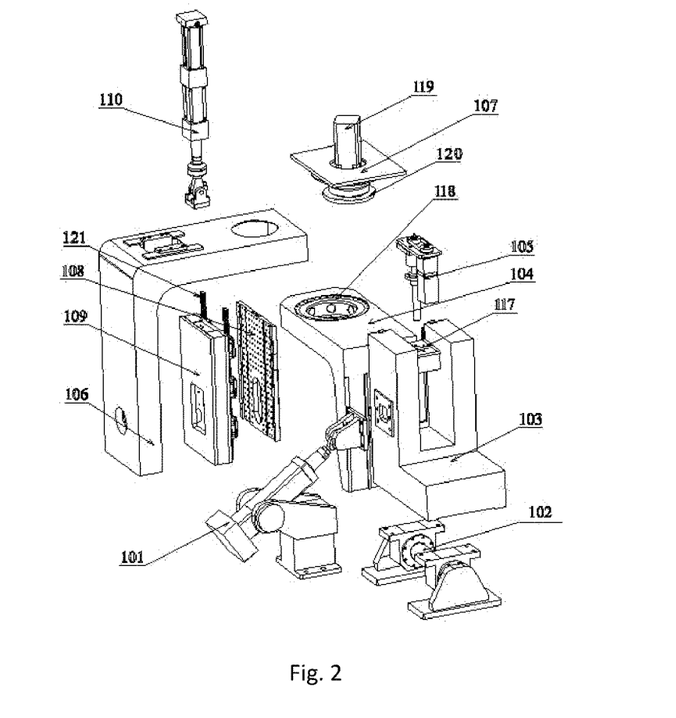
FIG. 2 is an assembly structural diagram (exploded view) of a loading system for an automobile chassis simulation road test according to the present application.

As shown in FIGS. 1-2, the inclination angle regulation assembly includes an inclination angle L arm fixing main body 103, an inclination angle rotation shaft 102 and an inclination angle regulation electronic control unit 101, the inclination angle L arm fixing main body 103 is movably connected to the mounting base 111 and can rotate around the inclination angle rotation shaft 102, as shown in FIG. 2, the inclination angle L arm fixing main body 103 is fixed to the inclination angle rotation shaft 102, and the inclination angle rotation shaft 102 is fixed on the mounting base 111 through bearings and bearing fixed seats at both ends of the inclination angle rotation shaft 102. One end of the inclination angle regulation electronic control unit 101 is movably connected to the mounting base 111, while the other end is movably connected with the inclination angle L arm fixing main body 103, and the inclination angle regulation electronic control unit 101 can drive the inclination angle L arm fixing main body 103 to rotate around the inclination angle rotation shaft 102. The inclination angle regulation electronic control unit 101 is an electric cylinder (or may be an air cylinder or a hydraulic cylinder).

Figure 3:
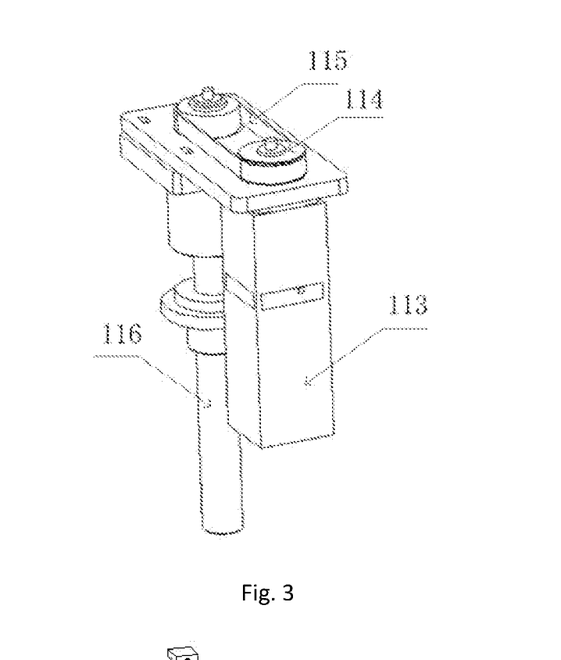
FIG. 3 is a partial structural diagram of an inclination angle L arm vertical regulation electronic control unit of a loading system for an automobile chassis simulation road test according to the present application.

As shown in FIGS. 1-2, the automobile weight loading assembly includes an inclination angle L arm 104 and an inclination angle L arm vertical regulation electronic control unit 105, a vertical downward first guide rail 112 is formed on a lateral surface of the inclination angle L arm fixing main body 103, the inclination angle L arm 104 is arranged on the first guide rail 112, the inclination angle L arm vertical regulation electronic control unit 105 is arranged in a slot formed in the inclination angle L arm fixing main body 103, and the inclination angle L arm vertical regulation electronic control unit 105 can drive the inclination angle L arm 104 to move up and down along the first guide rail 112. As shown in FIGS. 2-3, the inclination angle L arm vertical regulation electronic control unit 105 includes a first motor 113, a first speed reducer 114, a belt 115, a first screw rod 116 and a first sliding block 117, an output end of the first motor 113 is connected with the first screw rod 116 through the first speed reducer 114 and the belt 115, the first motor 113 can drive the first screw rod 116 to rotate, the first sliding block 117 is fixedly connected with the inclination angle L arm 114, and the first screw rod 116 is matched with the first sliding block 117.

The rotation angle regulation assembly includes a rotation angle L arm 106, a first bearing 118 and a rotation angle regulation electronic control unit 107, a horizontal portion of the rotation angle L arm 106 is fixedly connected with an inner ring of the first bearing 118, and a horizontal portion of the inclination angle L arm 104 is connected with an outer ring of the first bearing 118. The rotation angle regulation electronic control unit 107 is arranged between the rotation angle L arm 106 and the inclination angle L arm 104, and can drive the rotation angle L arm 106 to rotate around a rotation shaft of the rotation angle regulation electronic control unit 107. The rotation angle regulation electronic control unit 107 includes a rotation angle motor 119 and a second speed reducer 120, a shell of the rotation angle motor 119 is fixed on the rotation angle L arm 106, and an output shaft of the rotation angle motor 119 is fixed on the inclination angle L arm 104 through the second speed reducer 120.

The vertical load loading assembly includes a vertical load hydraulic actuator 110, and the vertical load hydraulic actuator 110 is fixed on the rotation angle L arm 106, positioned over the adapter plate 108 and connected with the adapter plate 108. The adapter plate 108 is vertically fixed downwards inside a vertical portion of the rotation angle L arm 106.

A six-component sensor unit 109 is arranged between the adapter plate 108 and an inside of the vertical portion of the rotation angle L arm 106, the six-component sensor unit includes a bottom plate, a six-component sensor and a cover plate, and the six-component sensor is arranged between the bottom plate and the cover plate. The cover plate is provided with a second guide rail 121, the adapter plate 108 is arranged on the second guide rail 121, and the adapter plate 108 can move up and down along the second guide rail 121.

According to the loading system for the automobile chassis simulation road test, which is provided in Embodiment 1, the inclination angle regulation electronic control unit 101 regulates a rotation angle of the inclination angle L arm fixing main body 103 around the inclination angle rotation shaft 102, so that an inclination angle of the tested real automobile suspension assembly 3 is the same as that of a real automobile; the inclination angle L arm vertical regulation electronic control unit 105 regulates a vertical displacement of the inclination angle L arm 104, and the vertical load hydraulic actuator 110 regulates a vertical displacement of the adapter plate 108 so as to ensure that a preliminary load equal to an automobile weight of the real automobile is applied to the tested real automobile wheel 5 and suspension assembly 3 within a reasonable stroke range of the vertical load hydraulic actuator 110; the rotation angle regulation electronic control unit 107 drives the rotation angle L arm 106 to rotate, regulates a rotation angle of the wheel 5, simulates a turning working condition of the real automobile on a road, and applies a lateral load to a tested wheel and suspension system; and the vertical load hydraulic actuator 110 applies a vertical load, and the vertical load is transferred to the tested wheel and suspension assembly 3 through the adapter plate 108 so as to simulate a vertical load which the real automobile bears due to road bumpness when running on the road. The loading system in Embodiment 1 can simulate to apply various loads which a chassis bears in the real road running process of the automobile, and ensures consistency between a simulation test result and a real automobile test field detection result.

Embodiment 2

Figure 4:
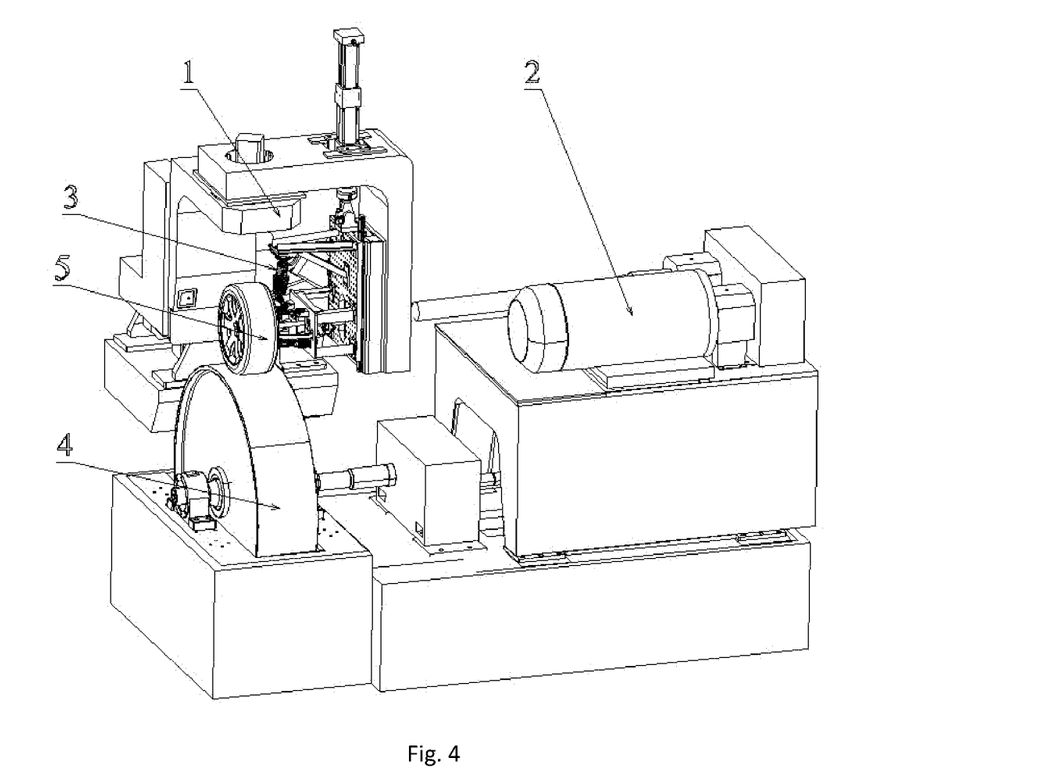
FIG. 4 is a structural schematic diagram of test equipment for an automobile chassis simulation road test according to the present application.

This embodiment provides test equipment for an automobile chassis simulation road test, as shown in FIG. 4, including the loading system 1 in Embodiment 1, an acceleration torque assembly 2, a suspension assembly 3 and a rotary drum assembly 4. The suspension assembly 3 includes a suspension fixing frame 314 and a quarter suspension for mounting a wheel 5, the quarter suspension is fixed on the suspension fixing frame 314, and the suspension fixing frame 314 is fixed on the adapter plate 108 of the loading system 1. An output end of the acceleration torque assembly 2 is connected with a transmission shaft 306 of the quarter suspension, and the acceleration torque assembly 2 is used for driving the wheel 5 (including a hub and a tire) to rotate. The suspension assembly 3 can be loaded onto the rotary drum assembly 4 through the wheel 5.

Figure 7:
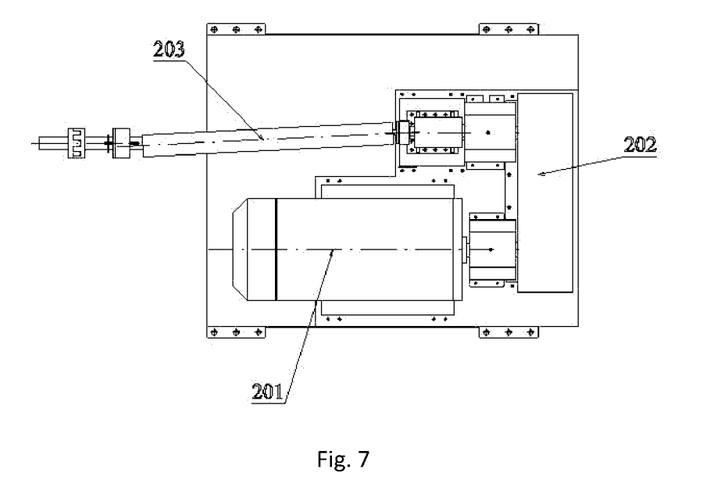
FIG. 7 is a structural schematic diagram of an acceleration torque assembly of test equipment for an automobile chassis simulation road test according to the present application.

As shown in FIG. 7, the acceleration torque assembly 2 includes a torque shaft driving motor 201, a speed reducer 202 and a torque shaft 203, an output shaft of the torque shaft driving motor 201 is connected with the torque shaft 203 through the speed reducer 202, and the torque shaft 203 is connected with the transmission shaft of the quarter suspension.

Figure 5:
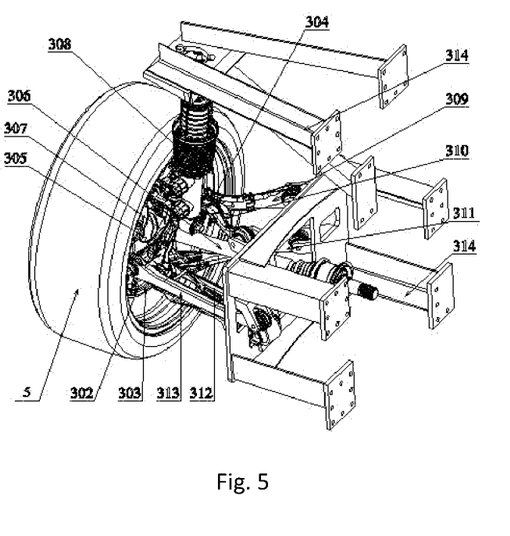
FIG. 5 is a structural schematic diagram of a wheel and a suspension assembly of test equipment for an automobile chassis simulation road test according to the present application.
Figure 6:
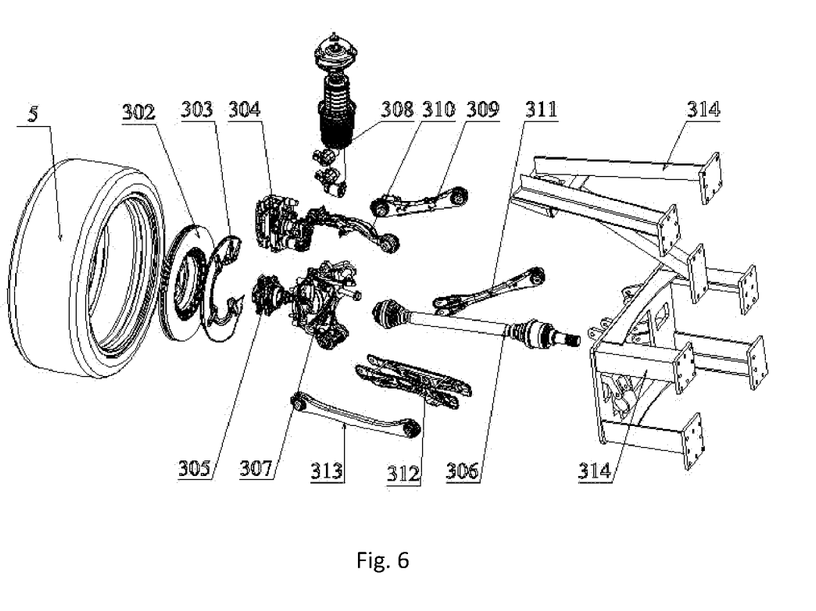
FIG. 6 is an assembly structural diagram (exploded view) of a wheel and a suspension assembly of test equipment for an automobile chassis simulation road test according to the present application.

As shown in FIGS. 5-6, the quarter suspension of the tested real automobile suspension assembly 3 includes a brake disc 302, a brake disc cover plate 303, a brake caliper 304, a hub bearing 305, a transmission shaft 306, a steering knuckle 307, a damper and spring 308, an upper front control arm 309, an upper rear control arm 310, a lower front control arm 311, a lower rear control arm 312, a toe-shaped control arm 313 and the suspension fixing frame 314. The brake disc 302, the brake disc cover plate 303, the brake caliper 304, the hub bearing 305, the transmission shaft 306, the steering knuckle 307, the damper and spring 308, the upper front control arm 309, the upper rear control arm 310, the lower front control arm 311, the lower rear control arm 312 and the toe-shaped control arm 313 are all original accessories of a certain type of saloon car.

The suspension fixing frame 314 is designed according to real automobile assembly dimensions, the tire of the wheel 5 is inflated to have normal tire pressure, and the wheel 5, the brake disc 302, the brake disc cover plate 303, the brake caliper 304, the hub bearing 305, the transmission shaft 306, the steering knuckle 307, the damper and spring 308, the upper front control arm 309, the upper rear control arm 310, the lower front control arm 311, the lower rear control arm 312 and the toe-shaped control arm 313 are mounted on the suspension fixing frame 314 according to an assembly relationship of the real automobile to form the tested real automobile wheel 5 and suspension assembly 3.

The suspension fixing frame 314 is connected with the adapter plate 108 of the wheel and suspension system through a bolt. The guide rail is formed on the cover plate of the six-component sensor unit 109, and the adapter plate 108 of the wheel and suspension system is connected with the six-component sensor unit 109 through the guide rail. The bottom plate of the six-component sensor unit 109 is connected to one lateral surface of the rotation angle L arm 106 through a bolt. The vertical load hydraulic actuator 110 is fixed on the rotation angle L arm 106, positioned over the adapter plate 108 of the wheel and suspension system, and connected with the adapter plate 108 of the wheel and suspension system.

The inclination angle L arm 104 is connected with the rotation angle L arm 106 through the rotation angle regulation electronic control unit 107, the first bearing 118 is a four-point contact ball bearing, the rotation shaft of the rotation angle regulation electronic control unit 107 and the outer ring of the four-point contact ball bearing are fixed on the inclination angle L arm 104, the inner ring of the four-point contact ball bearing and the shell of the rotation angle regulation electronic control unit 107 are connected with the rotation angle L arm 106, and the rotation angle motor 119 of the rotation angle regulation electronic control unit 107 drives the inner ring of the four-point contact ball bearing to rotate through the second speed reducer 120 so as to drive the rotation angle L arm 106 to rotate around the inclination angle L arm 104 (i.e., a rotation shaft of the rotation angle motor 119) and implement simulation on different rotation angles of the wheel 5 when the automobile makes a turn.

The first guide rail is formed on one lateral surface of the inclination angle L arm fixing main body 103, the inclination angle L arm 104 is connected with the inclination angle L arm fixing main body 103 through the first guide rail, the inclination angle L arm vertical regulation electronic control unit 105 is arranged in the inclination angle L arm fixing main body 103, power output by the first motor 113 of the inclination angle L arm vertical regulation electronic control unit 105 drives the first screw rod 116 to rotate through the first speed reducer 114 and the belt 115, the first screw rod 116 is matched with the first sliding block 117, and the first sliding block 117 is connected with the inclination angle L arm 104 so that the first motor 113 can drive the inclination angle L arm 104 to move up and down along the guide rail on the inclination angle L arm fixing main body 103, and then the wheel 5 is pressed on a rotary drum 401 according to a condition that the real automobile bears the dead weight.

The inclination angle rotation shaft 102 is mounted below the inclination angle L arm fixing main body 103, the inclination angle regulation electronic control unit 101 is mounted on one side of the inclination angle L arm fixing main body 103, and an output end of the inclination angle regulation electronic control unit 101 drives the inclination angle L arm fixing main body 103 to rotate around the inclination angle rotation shaft 102, so that by means of the inclination angle L arm 104, the rotation angle L arm 106, the six-component sensor unit 109 and the adapter plate 108 which are connected, finally, it is realized that the wheel 5 of the tested suspension assembly 3 forms an external inclination angle, which is the same as an external inclination angle of the real automobile, with a vertical face of the real automobile.

Figure 8:
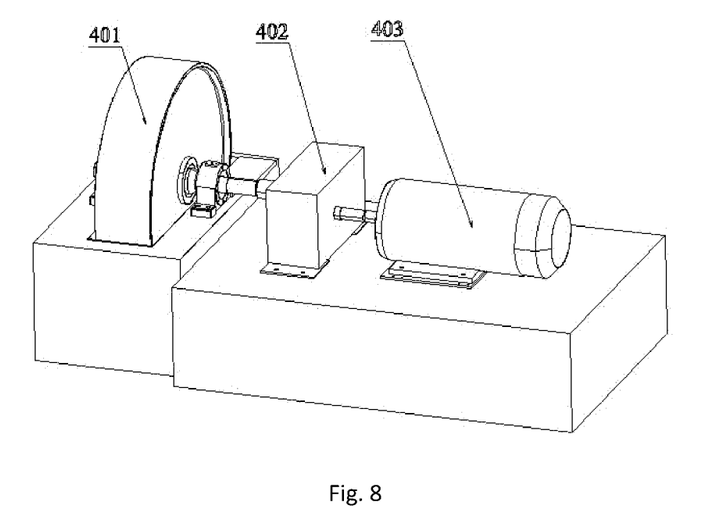
FIG. 8 is a structural schematic diagram of a rotary drum assembly of test equipment for an automobile chassis simulation road test according to the present application.

As shown in FIG. 8, the rotary drum assembly 4 includes the rotary drum 401, a rotary drum speed reducer 402 and a rotary drum motor 403, the rotary drum motor 403 drives the rotary drum 401 to rotate, a material of the rotary drum 401 is carbon steel Q345, an output shaft of the rotary drum motor 403 is connected with a central shaft of the rotary drum 401 through the rotary drum speed reducer 402, the rotary drum motor 403 can drive the rotary drum 401 to rotate, and a linear running state of the wheel 5 on the road is reduced. When the wheel 5 is loaded onto the rotary drum 401, rotation of the rotary drum 401 can drive the wheel 5 to rotate.

The acceleration torque assembly 2 includes the torque shaft driving motor 201, the speed reducer 202 and the torque shaft 203, the torque shaft 203 is connected with the transmission shaft 306 of the quarter suspension of the tested suspension assembly 3, and the output shaft of the torque shaft driving motor 201 drives the wheel 5 to accelerate rotation through the speed reducer 202, the torque shaft 203 and the transmission shaft 306.

According to the test equipment for the automobile chassis simulation road test in Embodiment 2, in the testing process, the tested real automobile wheel 5 and wheel suspension system 3 are fixed to the adapter plate 108 of the loading system 1; the inclination angle regulation electronic control unit 101 regulates the rotation angle of the inclination angle L arm fixing main body 103 around the inclination angle rotation shaft 102, so that the the inclination angle of the tested real automobile suspension assembly 3 is the same as that of the real automobile; the inclination angle L arm regulation electronic control unit 105 regulates the vertical displacement of the inclination angle L arm 104, and the vertical load hydraulic actuator 110 regulates the vertical displacement of the adapter plate 108 so as to ensure that the preliminary load equal to the automobile weight of the real automobile is applied to the tested suspension assembly 3 within the reasonable stroke range of the vertical load hydraulic actuator 110; the rotary drum rotates to drive the wheel 5 to rotate, so that the tested wheel 5 and suspension assembly 3 implements simulation on the working condition that the real automobile linearly runs on the road; the rotation angle regulation electronic control unit 107 drives the rotation angle L arm 106 to rotate, regulates the rotation angle of the wheel 5, simulates the working condition that the real automobile makes a turn on the road, and applies the lateral load to the tested wheel and suspension system; the vertical load hydraulic actuator 110 applies the vertical load, and the vertical load is transferred to the tested suspension assembly 3 and wheel 5 through the adapter plate 108 so as to simulate the vertical load which the real automobile bears due to road bumpness when running on the road; and the acceleration torque assembly 2 applies acceleration torque to the wheel through the transmission shaft 306, simulates a working condition of accelerated running of the real automobile on the road, and applies a longitudinal load to the tested suspension assembly 3 and wheel 5.

When the test equipment for the automobile chassis simulation road test in Embodiment 2 carries out the automobile chassis simulation road test, the test is carried out according to the following steps.

1. Test parameters are determined. Test objects are a left rear wheel of a certain type of saloon car and a suspension system thereof, the external inclination angle of the wheel is 1.594°, the automobile dead weight is 2,145 kg, the full-load automobile weight is 2,825 kg, and a target load file is an autonomously acquired road load spectrum.

2. The tested wheel and suspension system is assembled. The wheel 5, the brake disc 302, the brake disc cover plate 303, the brake caliper 304, the hub bearing 305, the transmission shaft 306, the steering knuckle 307, the damper and spring 308, the upper front control arm 309, the upper rear control arm 310, the lower front control arm 311, the lower rear control arm 312 and the toe-shaped control arm 313 of the certain type of saloon car are purchased in the market. Four strain gauges are adhered to a spoke, a wheel center, an outer rim and an inner rim of the wheel. The hub and the tire are assembled into the wheel 5, the tire is inflated to have the tire pressure of 200 kPa, and the wheel 5 is mounted on the suspension fixing frame 314 according to the assembly relationship of the original automobile to form the tested real automobile wheel 5 and suspension assembly 3.

3. The tested wheel and suspension system is mounted to the loading system. The suspension fixing frame 314 of the tested real automobile suspension assembly 3 is connected with the adapter plate 108 through the bolt.

4. The six-component sensor is mounted for the wheel. The six-component sensor is mounted on the hub of the wheel 5.

5. The external inclination angle of the wheel is regulated. The inclination angle regulation electronic control unit 101 drives the inclination angle L arm fixing main body 103 to rotate around the inclination angle rotation shaft 102 by 1.594° so as to drive a wheel and tire assembly 301 to generate the external inclination angle of 1.594°.

6. An automobile weight vertical load is applied. The inclination angle L arm vertical regulation electronic control unit 105 drives the inclination angle L arm 104 to move downwards along the guide rail on the inclination angle L arm fixing main body 103, so that the wheel and tire assembly 301 is pressed on the hub 401, and the vertical load equal to a quarter of a full-load automobile weight of 706.25 kg is generated.

7. The load file is applied. The rotation angle regulation electronic control unit 107, the vertical load hydraulic actuator 110 and the acceleration torque assembly 2 are started up, the lateral load, the vertical load and the acceleration torque are applied to the tested real automobile wheel and suspension system 3 according to the target load file, and strain signals of the strain gauges adhered to the wheel are acquired.

8. Damage is calculated. Statistic analysis of a strain amplitude and a cumulative frequency is carried out, and an actually measured wheel damage value is calculated in correspondence to a standard (amplitude) S-N (frequency) curve.

Contrast Example 1: Road Simulation Test of Wheel.

The same type of wheel and tire assembly in Embodiment 2 is selected, strain gauges are adhered to the same positions on the wheel with the positions in Embodiment 2, a road simulation test of the wheel is carried out on a road simulation tester, the same target load file with Embodiment 2 is applied, strain signals in the loading process are acquired, and calculation is carried out to obtain a damage value of the wheel.

Embodiment 2 and Contrast Example 1 select the same wheel and tire assembly and target load file, and thus have comparability. Test data measured in Embodiment 2 and Contrast Example 1 are put into Table 1 for comparison, and a result table is as follows:

TABLE 1

Test Results of Embodiment 2 and Contrast Example 1

| Test Group | Damage Value of Strain Gauge 1 | Damage Value of Strain Gauge 2 | Damage Value of Strain Gauge 3 | Damage Value of Strain Gauge 4 |
| --- | --- | --- | --- | --- |
| Embodiment 2 | 1.2 | 1.2 | 1.4 | 1.2 |
| Contrast Example 1 | 1.2 | 1.3 | 1.5 | 1.3 |

It can be seen from the test results that in case of adopting the same wheel and tire assembly and target load file, consistency between the test result obtained when the test equipment for the automobile chassis simulation road test according to the present disclosure is adopted to carry out the automobile chassis simulation road test and the wheel damage result measured on the conventional road simulation tester is high, and the loading system and the test equipment for the automobile chassis simulation road test according to the present disclosure can apply the accurate load to the wheel and suspension system.

What is claimed is:

1. A loading system for an automobile chassis simulation road test, comprising:
    a mounting base;
    an inclination angle regulation assembly mounted on the mounting base, the inclination angle regulation assembly comprises an inclination angle L arm fixing main body, a vertical downward first guide rail is formed on a lateral surface of the inclination angle L arm fixing main body;
    an automobile weight loading assembly arranged on the inclination angle regulation assembly, the automobile weight loading assembly comprises an inclination angle L arm arranged on the first guide rail;
    a rotation angle regulation assembly arranged on the automobile weight loading assembly, the rotation angle regulation assembly comprises a rotation angle L arm and a first bearing, a horizontal portion of the rotation angle L arm is fixedly connected with an inner ring of the first bearing, a horizontal portion of the inclination angle L arm is connected with an outer ring of the first bearing;

a vertical load loading assembly arranged on the rotation angle regulation assembly; and an adapter plate vertically fixed downwards on the rotation angle regulation assembly, wherein the adapter plate is used for mounting a suspension assembly and a wheel, and wherein the vertical load loading assembly acts on an upper end of the adapter plate.

2. The loading system for the automobile chassis simulation road test according to claim 1, wherein the inclination angle regulation assembly further comprises an inclination angle rotation shaft and an inclination angle regulation electronic control unit, and the inclination angle L arm fixing main body is movably connected to the mounting base and can rotate around the inclination angle rotation shaft; one end of the inclination angle regulation electronic control unit is movably connected to the mounting base, while the other end is movably connected with the inclination angle L arm fixing main body, and the inclination angle regulation electronic control unit can drive the inclination angle L arm fixing main body to rotate around the inclination angle rotation shaft;

the automobile weight loading assembly further comprises an inclination angle L arm vertical regulation electronic control unit, the inclination angle L arm vertical regulation electronic control unit is arranged on the inclination angle L arm fixing main body, and the inclination angle L arm vertical regulation electronic control unit can drive the inclination angle L arm to move up and down along the first guide rail;

the rotation angle regulation assembly further comprises a rotation angle regulation electronic control unit, the rotation angle regulation electronic control unit is arranged between the rotation angle L arm and the inclination angle L arm, and can drive the rotation angle L arm to rotate around a rotation shaft of the rotation angle regulation electronic control unit; and the vertical load loading assembly comprises a vertical load hydraulic actuator, and the vertical load hydraulic actuator is fixed on the rotation angle L arm, positioned over the adapter plate and connected with the adapter plate; and the adapter plate is vertically fixed downwards inside a vertical portion of the rotation angle L arm.

3. The loading system for the automobile chassis simulation road test according to claim 2, wherein the inclination angle regulation electronic control unit is any one of an electric cylinder, an air cylinder and a hydraulic cylinder.

4. The loading system for the automobile chassis simulation road test according to claim 2, wherein the inclination angle L arm vertical regulation electronic control unit comprises a first motor, a first speed reducer, a belt, a first screw rod and a first sliding block, an output end of the first motor is connected with the first screw rod through the first speed reducer and the belt, and the first motor can drive the first screw rod to rotate; and the first sliding block is fixedly connected with the inclination angle L arm, and the first screw rod is matched with the first sliding block.

5. The loading system for the automobile chassis simulation road test according to claim 2, wherein the rotation angle regulation electronic control unit comprises a rotation angle motor and a second speed reducer, a shell of the rotation angle motor is fixed on the rotation angle L arm, and an output shaft of the rotation angle motor is fixed on the inclination angle L arm through the second speed reducer.

6. The loading system for the automobile chassis simulation road test according to claim 2, wherein a six-component sensor unit is arranged between the adapter plate and an inside of the vertical portion of the rotation angle L arm, the six-component sensor unit comprises a bottom plate, a six-component sensor and a cover plate, and the six-component sensor is arranged between the bottom plate and the cover plate; and the cover plate is provided with a second guide rail, the adapter plate is arranged on the second guide rail, and the adapter plate can move up and down along the second guide rail.

7. A test equipment for an automobile chassis simulation road test, comprising:

the loading system for the automobile chassis simulation road test according to claim 1;

a rotary drum assembly;

a suspension assembly configured to be loaded onto the rotary drum assembly through the wheel, the suspension assembly comprising a suspension fixing frame and a quarter suspension for mounting a wheel, the quarter suspension is fixed on the suspension fixing frame, and the suspension fixing frame is fixed on the adapter plate;

an acceleration torque assembly having an output end connected with a transmission shaft of the quarter suspension so as to drive the wheel to accelerate rotation.

8. The test equipment for the automobile chassis simulation road test according to claim 7, wherein the acceleration torque assembly comprises a torque shaft driving motor, a speed reducer and a torque shaft, an output shaft of the torque shaft driving motor is connected with the torque shaft through the speed reducer, and the torque shaft is connected with the transmission shaft of the quarter suspension.

9. The test equipment for the automobile chassis simulation road test according to claim 7, wherein the rotary drum assembly comprises a rotary drum, a rotary drum speed reducer and a rotary drum motor, an output shaft of the rotary drum motor is connected with a central shaft of the rotary drum through the rotary drum speed reducer, and the rotary drum motor can drive the rotary drum to rotate.

* * * * *